United States Patent
Jankovsky

(10) Patent No.: US 7,525,412 B2
(45) Date of Patent: Apr. 28, 2009

(54) SYSTEM AND METHOD FOR PERFORMING TRANSMITTER FUNCTION MAPPING

(75) Inventor: Thomas Jason Jankovsky, South Elgin, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 360 days.

(21) Appl. No.: 11/063,673

(22) Filed: Feb. 23, 2005

(65) Prior Publication Data

US 2006/0186991 A1    Aug. 24, 2006

(51) Int. Cl.
*G06K 19/00* (2006.01)

(52) U.S. Cl. .................. 340/5.71; 340/5.7; 340/5.1; 340/5.2; 340/5.26; 340/825.72; 340/825.69

(58) Field of Classification Search ............... 340/5.71, 340/5.1, 5.2, 5.7, 5.26, 825.72, 825.69
See application file for complete search history.

(56) References Cited

U.S. PATENT DOCUMENTS

| | | | |
|---|---|---|---|
| 4,750,118 A | | 6/1988 | Heitschel et al. |
| 5,278,480 A | * | 1/1994 | Murray ................. 318/626 |
| 5,751,224 A | | 5/1998 | Fitzgibbon |
| 6,856,237 B1 | * | 2/2005 | Richmond et al. ......... 340/5.23 |
| 6,975,203 B2 | * | 12/2005 | Brookbank et al. ........ 340/5.26 |
| 2003/0016139 A1 | | 1/2003 | Teich et al. |
| 2003/0227370 A1 | | 12/2003 | Brookbank et al. |

* cited by examiner

*Primary Examiner*—Brian A Zimmerman
*Assistant Examiner*—Vernal U Brown

(57) ABSTRACT

A moveable barrier operator is operated in response to a code transmitted from a code transmitter. A learning entering mode is entered at a moveable barrier operator. One of a plurality of functions is selected to be performed at the moveable barrier operator. A transmitter is actuated and a code is received from the transmitter at the operator. A data structure is formed that associates the received code with the selected one of the plurality of functions.

17 Claims, 3 Drawing Sheets

| | |
|---|---|
| CODE 1 | TURN LIGHT ON |
| CODE 2 | OPEN DOOR |
| CODE 3 | CLOSE DOOR |
| CODE 4 | HALT DOOR |
| CODE 5 | OPEN DOOR AND TURN ON LIGHT |

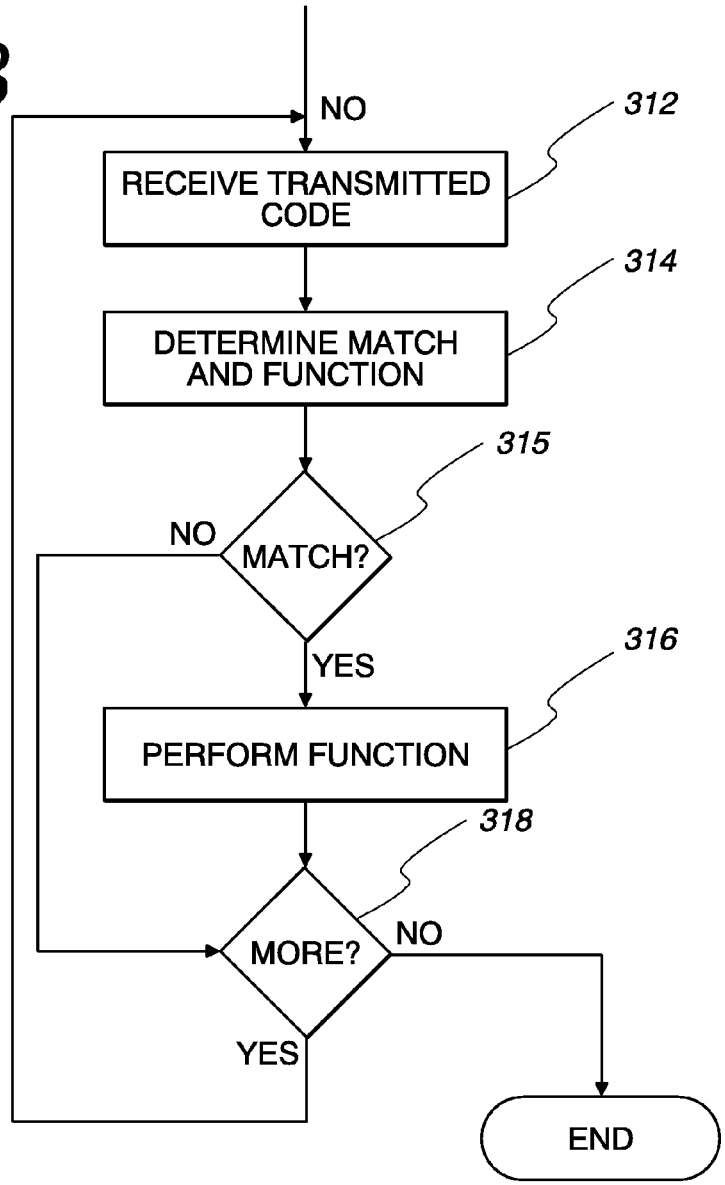
Fig.3B
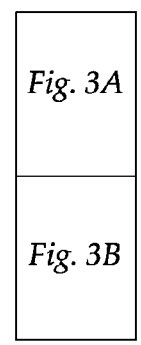
Fig. 3
Fig. 3A
Fig. 3B

SYSTEM AND METHOD FOR PERFORMING TRANSMITTER FUNCTION MAPPING

FIELD OF THE INVENTION

The field of the invention relates to moveable barrier operators and, more specifically, to mapping transmitter actions to perform various functions at moveable barrier operators.

BACKGROUND

Different types of moveable barrier operators have been sold over the years and these systems have been used to actuate various types of moveable barriers. For example, garage door operators have been used to move garage doors while gate operators have been used to open and close gates.

Such barrier movement operators may include a wall control unit, which is connected to send signals to a head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

The wall control unit or control on a logic board often provides a number of function buttons or switches that are used to perform functions at the barrier. These functions may include opening the barrier, closing the barrier, halting the movement of the barrier, reversing the movement of the barrier turning associated lights on and off, pressing an operator dependent activation sequences such as command input buttons, and enabling and disabling the timer to close the barrier. Selecting the functions on the wall control unit causes the functions to be performed at the barrier operator.

Barrier movement operators frequently operate in a variety of modes including a learning mode. In the learning mode of operation, a transmitter sends a code to the barrier operator. The reception of the code during the learning mode at the barrier operator identifies the transmitter (with the associated code) as a transmitter that is authorized to actuate the barrier. The operator then associates the code with the button on the particular transmitter for future operations. Such learning has been limited to learning a single function such as operating a door for all learned codes.

As mentioned, transmitters sometimes transmit a code to an operator in order to actuate the operator. In some previous systems, the code included a portion that identified a function for the operator to perform. However, this approach required that special programming be performed in both the transmitter and the operator to process the function-specific transmissions. In addition, the codes were fixed in the sense that a particular customer could not change or adjust functions or could only do so with great difficulty. Flexibility was also a problem because the codes were programmed into the system at the time of manufacture and could only be changed by extensive reprogramming of the transmitter and/or the operator. All these problems led to previous systems that were expensive to program and/or difficult to update or tailor to the requirements of specific customers.

SUMMARY

A system and method allows functions of a moveable barrier operator to be associated with security codes. Once the functions and codes are associated, the functions can easily be performed by transmitting the code from the transmitter, receiving the code at the barrier, determining the function to be performed based upon the received code, and performing the function that has been mapped at the operator. The function mapping sequences can be customized to the needs of specific users and can easily be modified as the requirements of users change over time.

A moveable barrier operator is operated in response to a code transmitted from a code transmitter, a learning mode is entered at a moveable barrier operator, and, thereafter, one of a plurality of functions is selected to be performed at the moveable barrier operator. A transmitter is actuated and the transmitter sends a code that is received at the operator. A data structure is formed that associates the received code with the selected one of the plurality of functions.

The particular function may be chosen by selecting one of a plurality of function buttons. Each function button may be previously associated with one or more functions. Alternatively, a combination of buttons may be associated with one or more functions. After the codes and functions have become associated and stored in a receiver's memory, the transmitter may be actuated and the code sent to the operator. The function associated with the code in the receiver's memory may then be performed.

The functions performed may include opening the barrier, closing the barrier, halting movement of the barrier, reversing movement of the barrier, turning on a light, performing edge and timer enable functions, an operator dependent activation sequence such as pressing a command input button, or enabling and disabling the timer to close the barrier. Other examples of functions are possible. In addition, functions that include several actions, such as opening a door and turning on a light, may also be defined.

The order of performing the steps to associate the codes to the functions may be varied. For example, a user may enter learning mode after the codes have been received and functions have been selected. In this regard, the selected function may be stored in a first memory location and the code in a second memory location. Alternatively, the last action may become associated when a transmitter is learned. Then, the learning mode may be entered and the codes and functions associated.

Thus, an approach is provided allowing functions to be associated with particular transmitter codes. The approaches described herein are easy to implement, can be easily modified, and can be adapted to the needs of individual users.

BRIEF DESCRIPTION OF THE DRAWINGS

FIG. 3 is a flowchart of one example of an approach for associating transmitted codes with barrier functions and using these codes to perform the functions according to the present invention.

Figure 1:
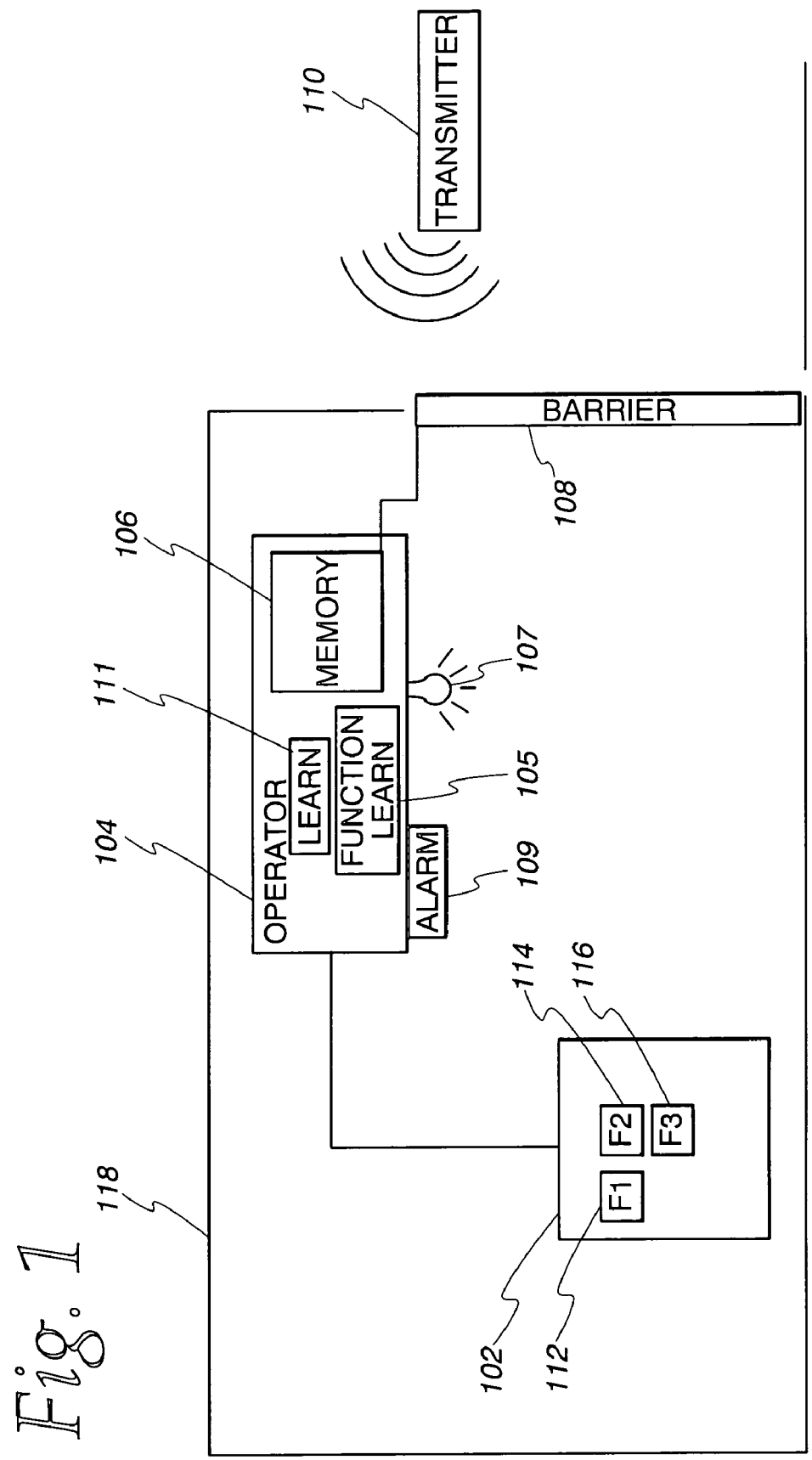
FIG. 1 is a block diagram of a system for learning functions of a barrier and associating the functions with codes according to the present invention.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Although the present description relates to the operations of a garage door operator, it is to be understood that the description included herein applies also to any type of moveable barrier operator such as a swinging or sliding gate operator. Referring now to the drawings and especially FIG. 1, a system for mapping functions to security codes using a transmitter is described. A moveable barrier operator 104 is situated in a garage 118. Alternatively, the operator 104 may be situated in some other structure such as a warehouse, or outside of a structure, such as about a gate. The operator 104 actuates a barrier 108. In this case, the barrier 108 is a garage door. Alternatively, the barrier 108 may be a swinging gate, a sliding gate, a swinging door, or shutters. Other examples of barriers are possible.

The operator 104 includes an improved or function learning mode button 105 that when pressed, causes the operator 104 to enter a learning mode. In this improved or function learning mode, a code may be received from a transmitter 110 and associated with a function or functions to be performed by the operator 104. In the present example, the transmitter 110 is a small, portable hand-held unit. The operator 104 may include a standard learning mode button 111 that is separate from the improved or function learning button 105. Pressing the standard learning mode button 111 causes the operator 104 to associate a security code with a transmitter that sends the code. The use of standard learning mode is known and will not be described further herein.

The operator 104 also includes a memory 106, which includes the mapping between the code received from the transmitter 110 and the functions to be performed at the operator 104. For example, the mapping may be stored in a table or by using data pointers. Other examples of data structures for storing the mapping are possible.

The operator 104 is connected, for example, using a hardwired connection, to a wall control unit 102, which includes function buttons 112, 114, and 116. Alternatively, the buttons 112, 114, and 116 may be any other type of switching arrangement and may be located on or in the operator 104. The function buttons 112, 114, 116, when pressed and the operator is in improved or function learning mode, alone or in combination, determine a certain function to perform. For example, one button may be associated with opening the barrier 108, another button with closing the barrier 108, still another button with halting the movement of the barrier 108, two buttons with reversing the movement of the barrier 108, another two buttons with turning on a light 107, and another two buttons with sounding an alarm 109.

Functions that include multiple actions may also be defined by selecting one or more of the buttons 112, 114, and 116. For example, functions may defined that both open the barrier 108 and turn on the light 107, or both close the barrier 108 and turn off the light 107. In operate mode, the operator senses the buttons pressed and performs the functions associated therewith. For example, a button may be associated with turning on a light of the operator and once this button is pressed, the light is activated.

In one example of the operation of the system of FIG. 1, the operator enters an improved or function learning mode where functions are associated with security codes. This may be accomplished by having the user at the operator 104 press or otherwise select the improved or function learning mode button 105. The user selects a function (including one or more actions) to perform by selecting a particular combination of the function keys 112, 114, and 116 at the wall control unit 102.

The transmitter 110 is actuated by a user and transmits a code. The operator 104 then receives the code from the transmitter 110. Upon receipt of the code and selection, a data structure is formed in the memory 106 that associates the received code from the transmitter 110 with the function selected at the wall control unit 102 of operator system. Thereafter, when the transmitter 110 transmits the code to the operator 104, the function associated with the code is performed at the operator 104.

The data structure formed in the memory 106 is any suitable structure that is capable of associating transmitted codes from the transmitter 110 with the selected functions. For example, the structure may be a table or use data pointers. Other examples of data structures are possible.

The order of performing the steps to associate the codes to the functions may also be varied. For example, a user may enter learning mode after the codes have been received and the functions have been selected. In this regard, the selected function may be stored in a first memory location of the memory 106 and the code in a second memory location of the memory 106. Then, the learning mode may be entered and the codes and functions associated in the data structure.

Figures 2, 3A:
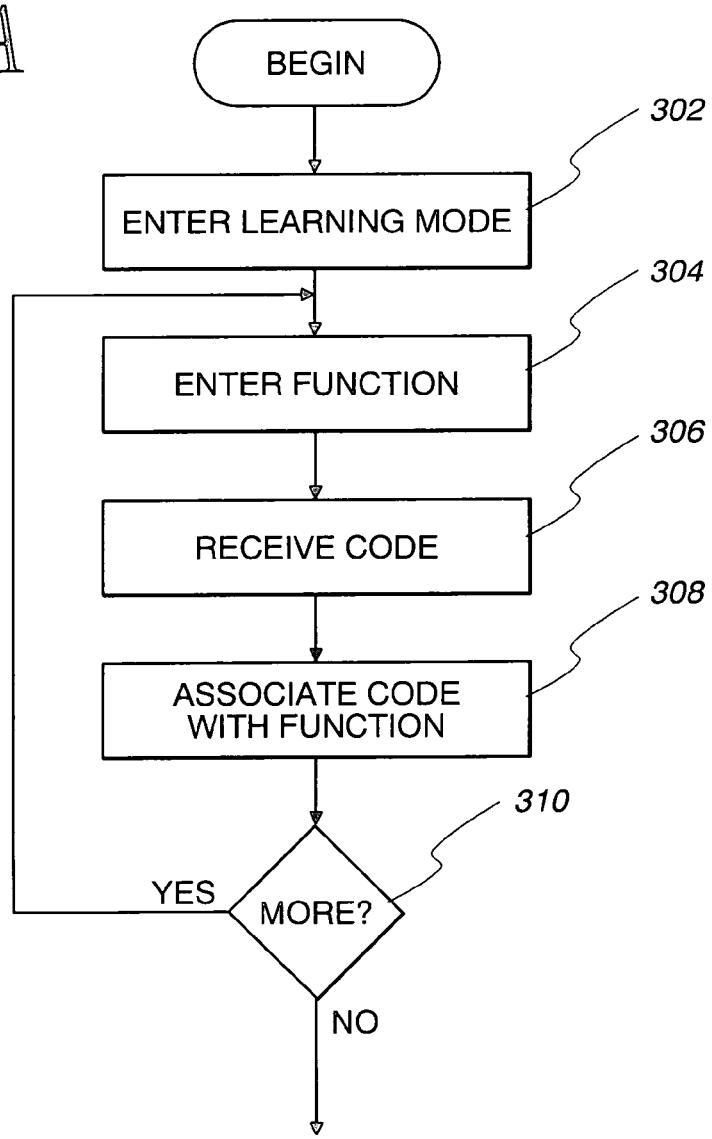
FIG. 2 is a block diagram of one example of a data structure for associating functions with transmitted codes according to the present invention.

Referring now to FIG. 2, one example of a data structure that associates functions to codes is described. The mapping is described in a table 200. The table 200 has first and second columns 202 and 204. The column 202 is a list of codes 1-5. The codes 1-5 may be hexadecimal values, binary values, or some other coded representation. The codes 1-5 may be fixed or rolling codes and if a rolling code, may include a fixed portion.

The column 204 includes functions to be performed at the operator. These functions include turning a light on, opening the door, closing the door, and halting movement of the door. In addition, functions that include multiple actions may also be defined. For example, the combination of opening the door and turning on the light at the operator can be associated with a code.

The rows 206 and 208 of the table 200 associate the functions with the codes received from the transmitter. For example, the row 206 associates the code 1 with the function of turning on a light. In another example, the row 208 associates the code 5 with the function of opening the door and turning on the light.

The table 200 is a dynamic data structure and changes over time as new entries are added and others deleted. The table 200 may be created by allowing a user at the operator to enter the learning mode of the operator. Once this occurs, a user selects the functions through use of switches or buttons on a wall control unit of the operator system. The transmitter is then actuated to produce a unique code. The code is thereby associated with the selected functions and an entry is created in the table 200.

In another example, entry into the learning mode occurs after the codes have been transmitted and the functions selected. In this case, the functions to be performed are selected and the transmitter is actuated to store the codes and the associated functions in a temporary location. When the learning mode is entered, then an entry is created in the table 200.

Referring now to FIG. 3, an example of an approach to map functions to transmitter codes is described. At step 302, an improved or function learning mode is entered, for example, by pressing a button at the operator. In this improved or function learning mode, a code is received from a transmitter and associated with a function or functions to be performed by the operator. At step 304, the function or functions to be performed are entered at the operator. For example, this can be performed by selecting switches or buttons at a wall control unit that is connected to the operator. Examples of functions that are performed at the operator include opening the barrier, closing the barrier, pausing the movement of the barrier, reversing the movement of the barrier, and turning on a light at the operator. Also, functions may be defined that include multiple actions such as opening the barrier and turning on a light at the barrier.

At step 306, a code is received from a transmitter. The code may be a rolling code (including a fixed portion) or a fixed code. The code is produced by having a user actuate the transmitter. At step 308, the code is associated with the selected function or functions at the operator. For example, a data structure may be created in memory and the code mapped to the selected functions by an entry in the data structure. In this regard, the data structure may be a table or similar arrangement and as new code/function combinations created, new entries are placed in the table. At step 310, it is determined if there are any more code-function entries to make in the data structure. If the answer is affirmative, then execution continues at step 304 as described above. If the answer is negative, execution continues at step 312.

At step 312, all the codes have been associated with the appropriate functions and a receiver at the barrier operator receives a transmitted code. At step 314, the operator compares the received code to the codes in the data structure stored in memory. At step 315, it is determined if a exact match has been found. Alternatively, it may be determined if a sufficiently similar code (to the transmitted code) has been identified in the data structure. If the answer is affirmative, execution continues with step 316. If the answer is negative, execution continues with step 318.

At step 316, the function is performed. For example, the door may be opened, closed, or its movement halted. At step 318, it is determined if more codes are to be received. If the answer is affirmative, execution continues with step 312 as described above. If the answer is negative, execution ends.

The order of the steps described in FIG. 3 that associate functions to codes can be altered. For example, in another approach, the steps 304-310 can be performed first and then the learning mode can be entered. The codes and functions can be stored in temporary memory locations before the system enters learning mode and the associated data structure created.

Thus, approaches are provided that allows functions to be associated with particular codes. The approaches described herein are easy to implement, can be modified over times, and can be adjusted to fit the needs of particular users.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A method of operating a moveable barrier operator in response to a code transmitted from a code transmitter comprising:
   entering a learning mode at a moveable barrier operator;
   selecting at least one of a plurality of functions to perform at the moveable barrier operator;
   receiving a code from a transmitter at the operator; and
   teaching the moveable barrier operator to perform the selected at least one of the plurality of functions in response to receiving the code from the transmitter regardless of a function previously associated with the code by forming a data structure that associates the received code with the selected at least one of the plurality of functions.

2. The method of claim 1 wherein entering a learning mode is performed previous to selecting the at least one of the plurality of functions.

3. The method of claim 1 wherein selecting at least one of the plurality of functions is performed previous to entering a learning mode.

4. The method of claim 1 wherein selecting at least one of the plurality of functions comprises selecting at least one of a plurality of function buttons, each button being associated with one of the plurality of functions.

5. The method of claim 1 further comprising subsequently actuating the transmitter and sending the code to the operator, and performing the function associated to the code.

6. The method of claim 1 wherein selecting at least one of the plurality of functions comprises entering a function selected from a group consisting of opening a barrier, closing a barrier, halting movement of a barrier, reversing movement of a barrier, turning a light on, and performing edge and timer enable.

7. The method of claim 1 further comprising storing the selected at least one function in a first memory location and the code in a second memory location and wherein entering a learning mode is performed after the function and code are stored.

8. A method of operating a moveable barrier operator comprising:
   creating a data structure;
   learning to perform at least one of a plurality of movable barrier operator functions in response to receiving a code from a transmitter regardless of a function previously associated with the code by storing a plurality of codes in the data structure, each in association with at least one of the plurality of moveable barrier operator functions;
   receiving a transmitted code from a transmitter; and
   comparing the transmitted code to the individual codes of the plurality of codes stored in the data structure to identify a code from the plurality of codes which matches the transmitted code, and subsequently determining the at least one of the plurality of functions associated with the matching code, and performing the associated at least one function.

9. The method of claim 8 wherein determining the at least one of the plurality of functions comprises determining a function selected from a group consisting of opening a barrier, closing a barrier, halting movement of a barrier, reversing movement of a barrier, turning a light on, and performing edge and timer enable.

10. A moveable barrier operator system comprising:
   a learning mode actuator for indicating that a user desires to enter a learning mode of an operator;
   a function actuator for selecting at least one of a plurality of functions to be performed at the operator;
   a receiver for receiving a code from a transmitter;
   a memory; and
   a controller coupled to the learning mode actuator, the function actuator, the receiver, and the memory, the controller programmed to enter a learning mode when the learning mode actuator is actuated and receive the selection of the at least one of the plurality of functions from the function actuator, the controller receiving the code from the receiver and forming a data structure in the memory that associates the code with the selected at least one of the plurality of functions for performance of the at least one of the plurality of functions regardless of a function previously associated with the code in response to receipt of the code.

11. The operator system of claim 10 wherein the at least one of the plurality of functions is selected from a group consisting of opening a barrier, closing a barrier, halting movement of a barrier, reversing movement of a barrier, turning a light on, and performing edge and timer enable.

12. The operator system of claim 10 wherein the controller is further programmed to store the entered function in a first memory location and the received code in a second memory location and await actuation of the learning mode actuator subsequent to when the at least one function and code are stored in the first and second memory locations.

13. The operator system of claim 10 wherein the learning mode actuator is a single button.

14. The operator system of claim 10 wherein the function actuator comprises a plurality of buttons.

15. The operator system of claim 10 wherein the function actuator comprises a plurality of switches.

16. The operator system of claim 10 wherein the function actuator is situated on a wall control unit.

17. The operator system of claim 10 wherein the function actuator is incorporated into a portable transmitter.

* * * * *